Patented Mar. 24, 1925.

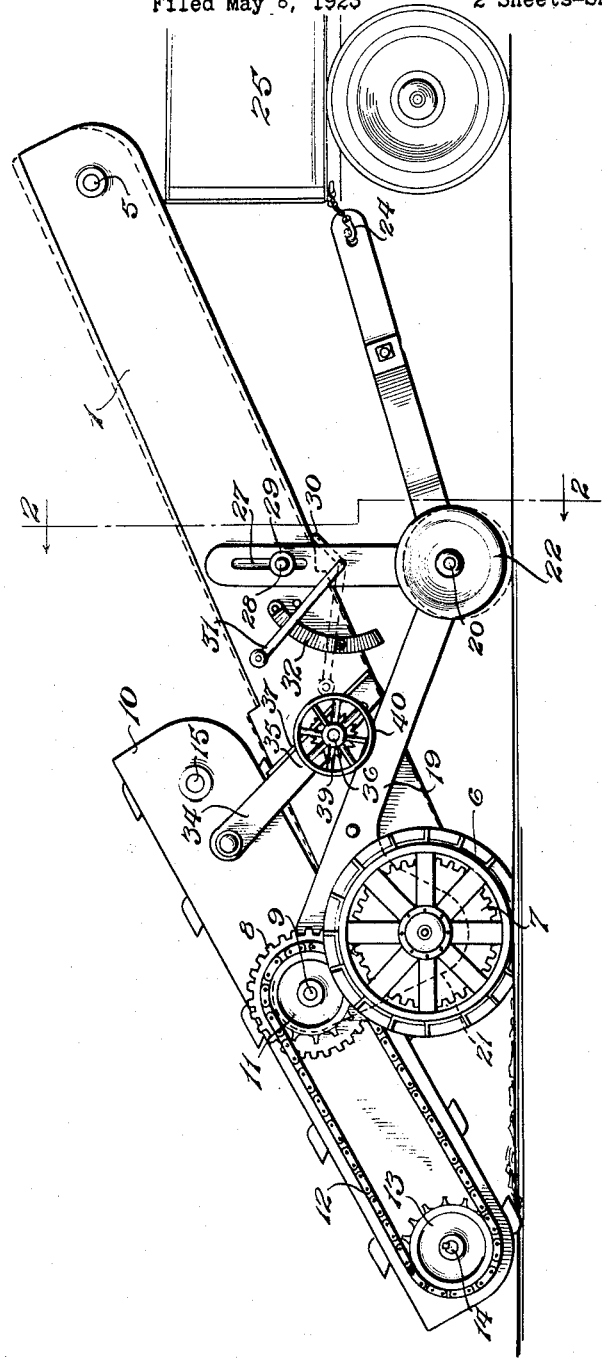

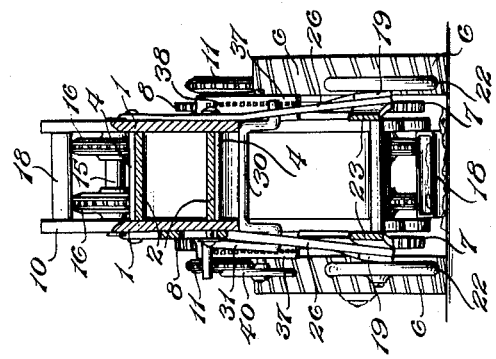

1,530,872

UNITED STATES PATENT OFFICE.

CALVIN WEST, OF LOUANN, ARKANSAS.

LOADER.

Application filed May 8, 1923. Serial No. 637,510.

*To all whom it may concern:*

Be it known that I, CALVIN WEST, a citizen of the United States, residing at Louann, in the county of Ouachita and State of Arkansas, have invented certain new and useful Improvements in Loaders, of which the following is a specification.

This invention relates to loaders and has for its object the provision of an apparatus which may be readily attached to a wagon or similar vehicle and drawn in rear of the wagon whereby it will operate to take up material and convey the same to and into the wagon, to be hauled away. One object of the invention is to provide an apparatus of simple construction which will be firmly supported when it is not in use and may be readily drawn from place to place but so arranged that the supporting means will be free from load when the machine is in use. Another object of the invention is to provide gathering means which will deposit the material to be loaded upon a conveyer which will operate to deliver the material into the wagon, and a further object of the invention is to provide efficient means for adjusting the gathering mechanism so that it may operate at any efficient angle. Other objects of the invention will appear in the course of the following description.

The invention is illustrated in the accompanying drawings, in which—

Figure 1 is a side elevation of my improved loader showing the same connected to a portion of a wagon;

Fig. 2 is a transverse section on the line 2—2 of Fig. 1, and

Fig. 3 is a longitudinal section.

In carrying out my invention, I employ a conveyer frame consisting of side bars or rails 1 and belt-sustaining and guiding plates 2 secured to and extending between the said side rails. Drums or rollers 3 are mounted in the ends of the side rails, and a conveyer belt 4 of the usual construction is trained around the said drums or rollers. The drums are keyed or otherwise secured upon shafts or axles 5 which are rotatably mounted in the side rails 1, and the ends of the lower axle or shaft are extended beyond the side rails and are equipped with traction ground wheels 6 which are adapted to ride upon the ground and be thereby rotated so as to impart rotation to the shaft, the drum carried by it, and the conveyer belt 4, as will be readily understood. Gears 7 are also secured upon the ends of this shaft or axle, and the said gears mesh with gears 8 secured upon a shaft 9 which extends through and is journaled in the side bars 10 of a trailer frame upon which the take-up devices are mounted. Sprockets 11 are also secured upon the ends of the shaft 9, and sprocket chains 12 are trained around said sprockets 11 and similar sprockets 13 which are secured upon a shaft 14 journaled in and extending through the side rails 10 adjacent the lower ends thereof. A shaft 15 is journaled in the side rails 10 at the upper ends thereof and, between the side rails, pairs of sprockets 16 are secured upon the shafts 14 and 15, parallel chains 17 being trained around the said sprockets, as will be readily understood. Buckets 18 are secured at intervals upon the chains 17 and are disposed transversely thereto, the chains being disposed adjacent the side plates 10 and being secured to the end portions of the buckets.

Secured rigidly to the side rails 1 near the lower ends thereof but in advance of the shaft 5 are frame bars or plates 19 which extend forwardly and downwardly from the said rails 1 and have an axle 20 carried by their front ends. The rear portions of the said frame plates are widened, as indicated by the dotted line at 21, and extend up to and around the shaft 9 so that they constitute supports for the trailer frame 10 and also serve to maintain the gears 7 and 8 in proper mesh. Rollers or wheels 22 are mounted upon the axle 20, and a tongue or draft bar 23 of any preferred form is also connected with the said axle, the said draft bar being constructed at its front end to be engaged by any coupling device 24 whereby it may be connected with the back end of a wagon, indicated at 25. The upper end of the conveyer frame will project over the end of the wagon, as clearly shown in Fig. 1, so that the material deposited upon the frame 4 will be discharged into the wagon. Standards 26 rise from the axle 20 and are disposed against the outer surfaces of the side rails 1 of the conveyer frame. In the upper portions of these standards are vertical slots 27 and guide pins or bolts 28 are engaged through the said slots and carried by the side rails 1 whereby to permit movement of the standards in rectilinear paths, washers or caps 29 being carried by the said guide pins and bearing against the outer faces of the standards so as to prevent the standards dropping away from the frame. A crank shaft 30 is journaled in these standards and has its crank portion bearing against the under edges of the rails 1 so that vertical movement of the standards and the axle 20 relative to the conveyer frame may be easily effected. The crank shaft is provided at one end with an operating handle or lever 31, and this lever may be engaged in a holding rack 32 on the side of the conveyer frame in any well known manner. When the apparatus is in use, the weight of the frame will be supported by the ground wheels 6 and by the upper end of the conveyer frame resting upon the back end of the wagon 25, and the lever 31 is then set, as shown in Fig. 1, so that the crank portion of the shaft 30 will project forwardly and, consequently, the small wheels 22 will be raised relative to the conveyer frame and will be out of contact with the ground and will not carry any of the load. After the wagon has been loaded and the coupling 24 is released, the rollers or small wheels 22 will, of course, come into contact with the surface of the ground and the lever 31 may then be manipulated so as to cause the crank 30 to ride under the conveyer frame and lift the same relative to the said wheels 22. If preferred, the lower edges of the rails 1 may be formed with notches 33 in which the crank portion of the shaft 30 may play, the lower or rear ends of said notches constituting stops to arrest the movement of the said shaft when the shaft is in a vertical position and, consequently, the vertical distance between the axle 20 and the bottom of the conveyer frame will be greatest.

The rails or plates 10 constituting the main portion of the gathering frame may obviously rock upon the shaft 9 and the gathering or trailer mechanism may thus be set to operate at any desired angle. To effect the adjustment of the trailer frame, links 34 are pivoted at their upper ends to the rails 10 adjacent the upper ends thereof and have their lower ends disposed adjacent the side rails 1 and provided with longitudinal slots 35 through which and the said side rails an adjusting shaft 36 extends. Each link 34 is provided upon its front edge with a lateral flange 37 in which are formed openings 38 so that said flange constitutes a rack to be engaged by a pinion 39 upon the shaft 36, a hand wheel 40 being secured upon the said shaft to facilitate its manipulation. Obviously when the shaft 36 is rocked in one or the other direction, the pinions 39 will effect travel of the racks 37 and thereby cause the links 34 to move upwardly or downwardly so that the trailer frame will be rocked about the shaft 9. The trailer or gathering frame may thus be set to operate at any desired angle or may be brought down onto the conveyer frame to be supported thereby when the device is to be moved from one point to another point of use.

The loading mechanism is operated only when it is coupled to the wagon or other vehicle which is to be loaded, as shown in Fig. 1, and it is then drawn along in rear of the wagon, as will be readily understood. When the loader is thus caused to travel, the ground wheels 6 will impart motion to the several operating mechanisms and the conveyer belt 4 will so move that its upper run travels forwardly. The gathering mechanism, however, consisting of the chain 17 and the buckets 18 carried thereby, will be caused to travel in the opposite direction so that its lower run moves forwardly. The buckets 18 will be thereby caused to successively engage the material to be taken up and will take up a portion of the same and carry it to the upper end of the take-up or trailer frame. As the buckets pass upwardly and rearwardly over the sprockets 16, the material in the buckets will drop from the same and will gravitate through the open space between the parallel chains and the side rails 10 so that it will be caught by the upper run of the conveyer belt 4 and then carried to and into the wagon. My improved mechanism is exceedingly simple and compact and its many advantages are thought to be evident to those skilled in the art.

Having thus described the invention, what is claimed as new is:

1. A loader comprising a conveyer, means for coupling the conveyer to a vehicle to be loaded, frame plates rising from the conveyer, a shaft carried by the upper ends of said frame plates, a trailer arranged in rear of the conveyer and pivotally mounted on said shaft, an endless belt gathering device mounted in the trailer to discharge onto the conveyer, operative connections between the gathering device and said shaft, means mounted upon the conveyer for driving the same and said shaft, and adjustable connections between the conveyer and the trailer whereby to adjust the trailer pivotally about said shaft.

2. A loader comprising a conveyer frame, means for coupling said frame to the rear end of a vehicle to be loaded, a shaft mounted transversely in the lower end of said frame, a conveyer belt within the frame to be driven by said shaft, ground wheels on said shaft to impart motion thereto when the conveyer frame is caused to travel, a trailer frame in rear of the conveyer frame in overlapping relation thereto, a shaft disposed transversely in the trailer frame and constituting a pivot therefor, bearings for said shaft carried by the conveyer frame, means carried by the trailer and the conveyer frame whereby to adjust the trailer pivotally in a vertical plane, gearing connecting the said shaft and the shaft at the lower end of the conveyer frame, sprockets mounted within the trailer frame at the ends thereof and driven from the said gearing, parallel chains trained around said sprockets, and buckets secured transversely to said parallel chains at intervals along the same, the said buckets being adapted to dump their contents through the space between the chains onto the conveyer belt.

3. A loader comprising a conveyer frame having its upper end adapted to be supported by a vehicle to be loaded, ground wheels supporting the lower end of the conveyer frame, frame plates secured to and projecting forwardly from the conveyer frame, an axle fitted in the front ends of said frame plates, a draft bar fitted upon said axle and adapted to be coupled to the wagon to be loaded, standards rising from the axle, means for holding the upper end portions of said standards to the conveyer frame and guiding them in rectilinear paths, a crank shaft mounted in the standards below the conveyer frame and having its crank portion bearing against the under side thereof, and means for holding said crank portion of the shaft in a set position.

In testimony whereof I affix my signature.

CALVIN WEST. [L. S.]